(12) United States Patent
Tofano

(10) Patent No.: US 8,849,898 B2
(45) Date of Patent: Sep. 30, 2014

(54) ADAPTIVE COLLABORATIVE DE-DUPLICATION

(76) Inventor: Jeffrey Vincent Tofano, San Jose, CA (US)

(*) Notice: Subject to any disclaimer, the term of this patent is extended or adjusted under 35 U.S.C. 154(b) by 361 days.

(21) Appl. No.: 12/963,951

(22) Filed: Dec. 9, 2010

(65) Prior Publication Data

US 2012/0150954 A1   Jun. 14, 2012

(51) Int. Cl.
*G06F 15/16*   (2006.01)
*G06F 9/50*    (2006.01)

(52) U.S. Cl.
CPC .................................. *G06F 9/5066* (2013.01)
USPC ....................................................... 709/203

(58) Field of Classification Search
CPC .................. H04L 67/2852; H04L 67/1095
USPC ......................................... 709/204, 203, 205
See application file for complete search history.

(56) References Cited

U.S. PATENT DOCUMENTS

| | | | | |
|---|---|---|---|---|
| 7,870,105 | B2* | 1/2011 | Arakawa et al. | 707/692 |
| 2010/0106691 | A1* | 4/2010 | Preslan et al. | 707/674 |
| 2010/0205158 | A1* | 8/2010 | Dybas | 707/692 |
| 2010/0333116 | A1* | 12/2010 | Prahlad et al. | 719/328 |
| 2011/0016095 | A1* | 1/2011 | Anglin et al. | 707/692 |
| 2011/0099351 | A1* | 4/2011 | Condict | 711/216 |
| 2011/0161723 | A1* | 6/2011 | Taleck et al. | 714/4.11 |
| 2012/0011101 | A1* | 1/2012 | Fang et al. | 707/654 |
| 2012/0084261 | A1* | 4/2012 | Parab | 707/654 |

* cited by examiner

*Primary Examiner* — Jason Recek

(57) ABSTRACT

Example apparatus, methods, and computers support adaptive, collaborative deduplication. One example method includes controlling a computer to compute a correlation between a processing state associated with collaborative data deduplication performed by the computer and an environmental state associated with a collaborative data deduplication environment with which the computer interacts. With the correlation in hand, the method then includes controlling the computer to adapt how the computer participates in collaborative data deduplication based, at least in part, on the correlation. The adaptations can include changing what processing is performed on the computer and what data is stored on the computer.

17 Claims, 6 Drawing Sheets

ADAPTIVE COLLABORATIVE DE-DUPLICATION

BACKGROUND

Conventionally, data de-duplication ("dedupe") may be performed to reduce the amount of data stored on a standalone computer. Significant data reductions have been achieved with conventional dedupe. While there are many standalone computers that benefit from conventional dedupe, there are many computers that do not stand alone. Computers may be arranged in networks, in client/server configurations, and may even participate in cloud-based computing. Dedupe may be performed in these non-standalone configurations.

When computers can communicate, computers may engage in collaborative processing. Computers may even engage in collaborative dedupe. In collaborative dedupe, some processing may be performed at clients that want data to be deduped and some processing may be performed at servers that dedupe the data. Additionally, some data may be stored at clients while some data may be stored at servers. Traditionally, the majority of the processing was performed at the server and the overwhelming majority of the data was stored at or by the server. Processing includes chunking, hashing, sampling, making a determination whether a chunk is unique, making a determination whether a chunk is similar to another chunk, searching indexes, and so on. Stored data includes the raw data, index data, metadata, and so on.

Conventionally, if collaborative dedupe was attempted, the collaborating computers would dedupe according to a set of pre-established rules and protocols. The set of rules and protocols may have been designed with certain assumptions in mind. While this assumption-based approach may have allowed the initial generic dedupe collaborations, the assumptions may have yielded sub-optimal performance in some configurations and may have yielded no improvements at all in other configurations. For example, sub-optimal performance may have been observed in some computers acting in client/server pairs or some computers engaged in cloud-based dedupe. Similarly, if collaborative dedupe was attempted, the collaborating computers would perform pre-defined roles according to a pre-defined distribution of work. Once again, the roles and distribution may have been designed with certain assumptions in mind, and those assumptions may have lead to sub-optimal performance.

One type of conventional dedupe includes chunking a larger data item (e.g., object, file) into sub-blocks, sampling the sub-blocks or computing an identifier (e.g., hash) for the sub-blocks, and processing the samples or identifiers instead of the sub-blocks. Chunking includes selecting boundary locations for fixed and/or variable length sub-blocks. Hashing includes computing a hash of the resulting chunk. Sampling includes selecting a subset of the resulting chunk. A chunk may also be referred to as a sub-block. Comparing relatively smaller hashes (e.g., 128 bit cryptographic hash) to make a unique/duplicate decision can be more efficient than comparing relatively larger chunks (e.g., 1 kB, 128 kB, 1 MB) of data using a byte-by-byte approach. Regardless of the dedupe particulars (e.g., chunking approach, hashing approach), it may be desirable to engage in collaborative cloud-based dedupe. Collaborative cloud-based dedupe may involve communicating data to be deduped, computing, recalling or communicating information about data to be deduped, communicating information about dedupe processing, and so on, between clients and servers using the cloud.

The term "cloud" is often used as a metaphor for the Internet. "Cloud computing" refers to network (e.g., internet) based computing where shared resources, software, interfaces, and information are provided to computers and other devices on demand. On-demand provision of resources in cloud computing is often compared to providing electricity on-demand because like the electricity grid, a cloud can provide dynamically scalable resources. In cloud computing, software, data, services, devices, and other entities reside at servers that can be accessed through a communication mechanism (e.g., network).

One model for cloud computing is to have multiple servers, each of which does something really well, and all of which work well together. Thus, multiple dedupe servers may be available, and different dedupe servers may be optimized for different functions. However, initial, conventional collaborative dedupe may not have recognized that different dedupe servers could provide different services, with different costs under different conditions (e.g., latency, error rate, security).

In cloud-based computing, customers may rent, lease, or subscribe for usage from a third-party provider. The customers consume resources (e.g., bandwidth, packets delivered, data stored, processor cycles used) as a service and pay for the resources consumed. The customers may be billed using a utilities model (e.g., electricity), on a subscription basis, or otherwise. Cloud-based computing customers may become interested in data de-duplication to reduce the amount of data stored and transmitted using the cloud.

BRIEF DESCRIPTION OF THE DRAWINGS

The accompanying drawings, which are incorporated in and constitute a part of the specification, illustrate various example methods, apparatuses, and other example embodiments of various aspects of the invention described herein. It will be appreciated that the illustrated element boundaries (e.g., boxes, groups of boxes, other shapes) in the figures represent one example of the boundaries of the elements. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
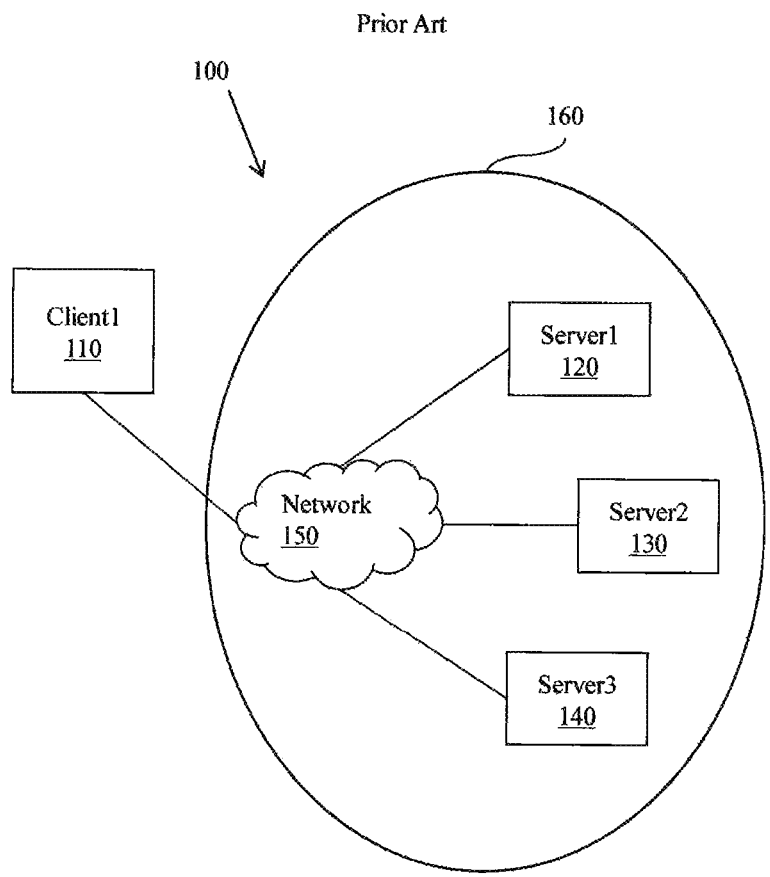
FIG. 1 illustrates a cloud-based collaborative de-duplication environment.

Example systems and methods support adaptive collaborative de-duplication. Example systems and methods recognize that elements (e.g., client, server, network) of a dedupe environment may experience different conditions at different times. Therefore, example systems and methods facilitate client-side adaptations for collaborative dedupe. The different conditions may exist on the client (e.g., processing load, memory available) or at the server (e.g., processing load, cost per byte to store different amounts of data). The different conditions may also exist on a communication medium (e.g., bandwidth available, latency, cost per byte transmitted) through which a client and server may communicate. Additionally, different paths between computers collaborating in dedupe may exist and different servers may be available to perform different functions at different times and costs. In different embodiments, client-side adaptations are supported for responding to these different conditions to satisfy different criteria. The criteria may include, for example, minimizing cost, minimizing delay, maximizing security, and so on. Sometimes these criteria may be competing and/or conflicting. For example, minimizing cost may require additional delay while minimizing delay may require additional cost. Therefore, in one embodiment, adaptations may be based on balancing a set of criteria.

The core of collaborative dedupe is to push some processing and some data out to clients without pushing too much processing and too much data out to the clients. Appropriate actions to be pushed to clients include identifying boundaries, forming chunks, and even sampling or hashing chunks. Appropriate data structures to store on clients may include small, permuted (e.g., ordered in a particular way) data structures. The small, permuted data structures are configured to help a client determine, for example, how much raw data to push out to a server, to which server(s) to push raw data, to which server(s) to push chunked data, to which server(s) to push hashes, to what server(s) to push sampled data, what hints to provide to a server concerning data being provided to the server, from which server(s) to pull blocks, and so on. While a client can be configured to store some data, participating in collaborative dedupe should not lead a client to store yet another copy of data that is, after all, supposed to be being de-duplicated. Similarly, while a client can be configured to perform some processing, participating in collaborative dedupe should not consume too many processor cycles or other processing resources at the client. Initial decisions concerning appropriate processing and appropriate storage may change over time with changing conditions.

Understanding source dedupe and target dedupe facilitates understanding collaborative dedupe. Source dedupe is a scheme where dedupe processing is always distributed between two or more nodes. Target dedupe is a scheme where dedupe processing is always performed at one node. Collaborative dedupe involves being able to mix both source and target dedupe. Selectively pushing appropriate processing and/or data to clients facilitates balancing wire cost against processing cost.

One type of data stored at a client may be, for example, data related to a previous action performed for a previously processed chunk. This data may have been generated by the client or may have been provided back from a server. When there is a great deal of redundancy in data, knowing that a chunk has been previously processed and stored at a server can significantly reduce data pushed from a client. If there is no data related to previously processed data, then the same raw data, sample or identifier (e.g., hash) associated with a chunk encountered one hundred times in a row will be pushed from the client to the server one hundred times in a row. With clouds and servers charging on a per-byte basis, this could be expensive. If there was a client-side memory that stored information concerning whether a recently processed chunk was stored at a server, treated as a duplicate at a server, treated as a unique at a server, or treated as a similar chunk at a server, then the expense of transmitting that chunk again could be reduced for the cost of maintaining the client-side memory.

Another type of data stored at a client may be, for example, "hint" data. The hint data may be designed to help a server that receives data to be deduped from a client. The hint may provide the server with clues concerning where the data to be deduped might be found on the server. These hints may allow the server to access a smaller index held in memory rather than accessing a larger "master" index, portions of which may be stored on disk. Thus, one adaptation made at a client may concern whether it has hint data and, if so, how it configures its hint memory. Another adaptation made at the client may also concern when, and if so, how it provides that hint data to a server. The hint data may be provided to the client from the server after the server processes some data. One adaptation associated with hint data may concern the granularity for hint data. In different examples, hint data may be stored for a device, for a file system, for a file, for a portion of a file, for a chunk, for an object, or for other organizations of data. Another adaptation associated with the hint data may concern how it is permuted (e.g., ordered). In different examples, hint data may be ordered on a most frequently used basis, a most recently used basis, on a first in first out basis, and in other ways.

While redundancy is described as one determining factor, other attributes may determine the size of a client-side memory, the configuration of a client-side memory, and how that client-side memory is maintained. Consider two different collaborative scenarios. In a first scenario, a communication path between client and server is slow, expensive, and/or unreliable. In this case, a larger client-side memory may be warranted because (re)transmitting duplicate data may be expensive in terms of time and money. In a second scenario, the path may be fast, inexpensive, and reliable. In this case, no client-side memory may be warranted because the cost of (re)transmitting duplicate data may be minimal.

One type of processing performed at a client may be, for example, chunking data and then creating a hash of the data or taking a sample of the data. Once again, different scenarios may dictate performing more or less processing at the client. When there is a fast, inexpensive, reliable path to a lightly burdened server then it may make sense to perform little if any processing at the client. However, if there is a slow, expensive, unreliable path to a heavily burdened server, then it may make sense to perform more processing at the client. One skilled in the art will appreciate that a combination of client, server, and network may have different characteristics at different points in time. Therefore, example systems and methods may dynamically reconfigure memory or processing performed at a client in response to those different characteristics.

How a data set is processed at the client may be adapted based on conditions existing in different parts of a dedupe environment with which the client is interacting. Additionally, and/or alternatively, how a data set is processed at the client may be adapted based on dedupe results being achieved at a server. The results may indicate, for example, that many duplicates are being found, that few duplicates are being found, that no duplicates are being found, that a desired ratio of duplicates to uniques is being found, that a certain reduction amount is being achieved, and so on. Example systems and methods may recognize that each data set has its own redundancy level and that while some data may benefit from dedupe, other data may not. While many decisions concerning the cost/benefit of deduping a particular data set may be made at a server, some decisions may be made at a client. Once again, these decisions may change over time and in response to different conditions at the client, at the server, on the communications network, and elsewhere.

Client-side adaptations may be configured to respond to different attributes. For example, one client-side adaptation may be aimed at mitigating issues associated with latency while another client-side adaptation may be aimed at minimizing per-byte charges. Different clients may be configured to respond in different ways depending on whether they care more about latency, cost, security, or other factors.

FIG. 1 illustrates a cloud-based collaborative dedupe environment 100. In environment 100, client1 110 interacts with server1 120, server2 130, and server3 140 through a network 150. The servers may all perform dedupe but may have different attributes (e.g., throughput, storage, capacity, cost, dialect). The network 150 may be, for example, the internet. Server1 120, server2 130, server3 140, and network 150 may be part of a cloud 160 with which client1 110 can interact. There may be many different paths from client1 110 to the servers and these paths may have different attributes (e.g., cost, speed, security, error rate). These attributes may vary over time.

In one example, client 1 110 may have some data that it wants to have stored in an efficient de-duplicated manner. Client 1 110 may chunk and hash that data. Client 1 110 may then send a packet(s) out into the cloud 160 where a dedupe enabled server will recognize the packet, will recognize the dedupe approach (e.g., chunking, hashing, sampling) and be able to efficiently dedupe the data (e.g., selectively store unique chunks, selectively not store duplicate chunks). Client 1 110 may wish to optimize some operating parameter including, for example, minimizing cost, minimizing latency, minimizing error rates, maximum security, or combinations thereof. Optimizing these operating parameters may depend on the conditions that exist at any given point in time in different elements in the collaborate deduplication environment in which the deduplication is occurring. For example, at one point in time client1 110 may have almost no spare memory, may have almost no spare processing cycles, but may have a low cost, high speed channel to a server. In this case, client 1 110 may adapt to perform as little processing as possible and to store as little data as possible. At another point in time client 1 110 may have spare memory and cycles but may only have access to a high cost channel to a server. In this case, client1 110 may adapt to perform additional processing and may store some data that may help reduce the amount of traffic required to be sent over the channel.

Figure 2:
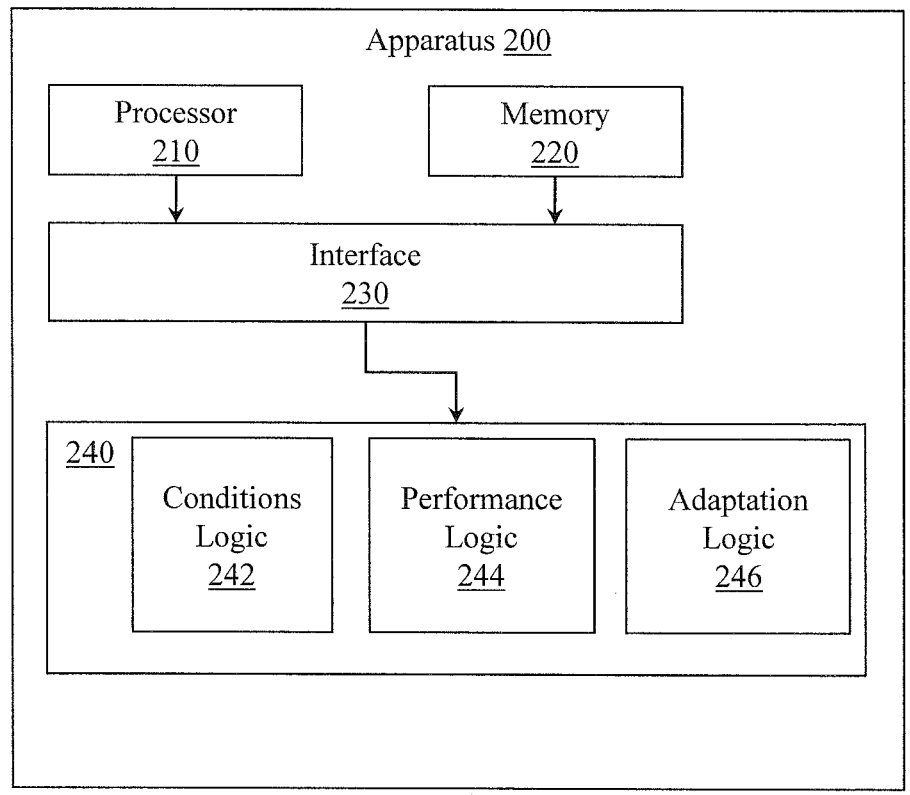
FIG. 2 illustrates an apparatus associated with adaptive collaborative de-duplication.

FIG. 2 illustrates an apparatus 200 that provides adaptive collaborative de-duplication. Apparatus 200 may be, for example, a data deduplication client apparatus. Apparatus 200 includes a processor 210, a memory 220, and an interface 230. Interface 230 connects the processor 210, the memory 220, and a set 240 of logics. The set 240 of logics includes a conditions logic 242, a performance logic 244, and an adaptation logic 246. Apparatus 200 may include other logics that support other interactions with a client/server environment, a cloud-based computing environment, or other collaborative environments. Using the set 240 of logics, apparatus 200 may participate in collaborative cloud-based data de-duplication, collaborative client/server based deduplication, and so on.

The conditions logic 242 may be configured to control the data deduplication client apparatus 200 to identify a current condition in a collaborative data deduplication environment. The current condition in the collaborative data deduplication environment may concern different elements in the collaborative deduplication environment. For example, the current condition may concern a current condition in the client apparatus 200, a current condition in a first deduplication server with which the client apparatus 200 is performing collaborative deduplication, a current condition in a second deduplication server with which the client apparatus 200 is considering performing collaborative deduplication, a current condition in a first communication path between the client apparatus 200 and the first server, a current condition in a second communication path between the client apparatus 200 and the second server, and a current condition in a third communication path between the client apparatus 200 and the first server. Other conditions may also be identified.

The conditions in the different elements relate to processing, storage, and other tasks or resources associated with the different elements. For example, the current condition in the client apparatus 200 may concern one or more of, processing cycles available on the client apparatus 200, memory available on the client apparatus 200, disk space available to the client apparatus 200, and entropy of data to be collaboratively deduplicated by the client apparatus 200 and a collaborating server.

The current condition in the first deduplication server may concern one or more of, processing cycles available on the first server, memory available on the first server, disk space available to the first server, a first deduplication approach available on the first server, and a first deduplication reduction factor achieved by the first server during collaborative deduplication performed with the client apparatus 200. The first deduplication reduction factor may describe one or more of, the reduction of stored data, and the reduction of transmitted data. Similarly, the current condition in the second deduplication server may concern one or more of, processing cycles available on the second server, memory available on the second server, disk space available to the second server, a second deduplication approach available on the second server, and a second deduplication reduction factor achieved by the second server during collaborative deduplication performed with a different client apparatus. Once again, the second deduplication reduction factor may describe one or more of, the reduction of stored data, and the reduction of transmitted data. Other conditions may also be considered. For example, how data is being ingested may determine whether de-duplication can even be performed. Additionally, the order and randomness in which data is arriving may also determine whether de-duplication can even be performed.

Communication paths may also experience different conditions (e.g., cost, latency, error rate) at different times. Therefore, the current condition in the first communication path may concern one or more of, bandwidth available in the first communication path, cost per byte to transmit data over the first communication path, cost per packet to transmit data over the first communication path, latency on the first communication path, error rate on the first communication path, and security on the first communication path. Similarly, the current condition in the second communication path may concern one or more of, bandwidth available in the second communication path, cost per byte to transmit data over the second communication path, cost per packet to transmit data over the second communication path, latency on the second communication path, error rate on the second communication path, and security on the second communication path. Likewise, the current condition in the third communication path may concern one or more of, bandwidth available in the third communication path, cost per byte to transmit data over the third communication path, cost per packet to transmit data over the third communication path, latency on the third communication path, error rate on the third communication path, and security on the third communication path.

Identifying a condition may be performed in different ways. In different examples, the apparatus 200 and conditions logic 242 may send queries to databases, may send out sample packets, may examine responses to sample packets, may time round trip journeys for packets from apparatus 200 to a server and back, may examine data stored on the client apparatus

200, may examine device driver data on client apparatus 200, may examine statistics stored by network hardware, firmware, and/or software being used by client apparatus 200, and so on. One skilled in the art will appreciate that there are different ways to acquire information about current operating conditions for a computer, for another computer that the computer is interacting with, and for a network that the computer is interacting with.

The performance logic 244 may be configured to control the client apparatus 200 to identify a data deduplication performance criterion for the client apparatus 200. The data deduplication performance criterion identifies whether the client apparatus 200 is performing according to desired constraints. The constraints may concern cost, time, and so on. Thus, some example criterion concern cost to deduplicate data, time to deduplicate data, security of deduplicated data, resources consumed at the client apparatus, and a deduplication reduction factor. In different examples, there may be separate data deduplication performance criteria for archive based deduplication, for nearline based deduplication, and for online based deduplication.

The adaptation logic 246 may be configured to selectively reconfigure collaborative data deduplication processing performed by the client apparatus 200. The adaptation logic 246 may also be configured to selectively reconfigure deduplication related storage performed by the client apparatus 200. The selective reconfiguring may occur upon determining that the current condition and the performance criterion do not match a desired deduplication performance profile for the client apparatus 200. The desired deduplication performance profile can be computed as a function of factors including, but not limited to, cost compared to deduplication reduction achieved, time compared to deduplication reduction achieved, and resources compared to deduplication reduction achieved.

The client apparatus 200 may perform a set of deduplication tasks. Therefore, reconfiguring the client apparatus 200 by adapting the collaborative deduplication processing performed by the client apparatus 200 can include changing actions including, but not limited to, boundary identification, boundary placement, chunking, hashing, sampling, making a duplicate determination, making a similarity determination, preparing server hints, what processing is performed on the client apparatus, how much raw data is pushed from the client apparatus, to which server raw data is pushed, from which server data is pulled, and what server hints are provided to a server.

The client apparatus 200 may also perform a set of storage tasks. These tasks may be associated with permuted data structures stored on the client apparatus 200. Reconfiguring the client apparatus 200 by adapting deduplication related storage can include adapting the storing of raw data, chunked data, a hash for a chunk of data, a sample for a chunk of data, information concerning a deduplication decision for a chunk of data, and a server hint for a chunk of data. The server hints facilitate a server performing deduplication processing for the chunk of data. Reconfiguring the client apparatus 200 by adapting deduplication related storage performed by the client apparatus 200 can also include changing items including, but not limited to, the size of a permuted data structure on the client apparatus 200, the ordering of a permuted data structure on the client apparatus 200, the type of data stored on the client apparatus 200, how frequently data stored on the client apparatus 200 is accessed, what event triggers accessing data stored on the client apparatus 200, what even triggers manipulating data stored on the client apparatus 200, and the granularity of items for which data is stored.

Figure 3:
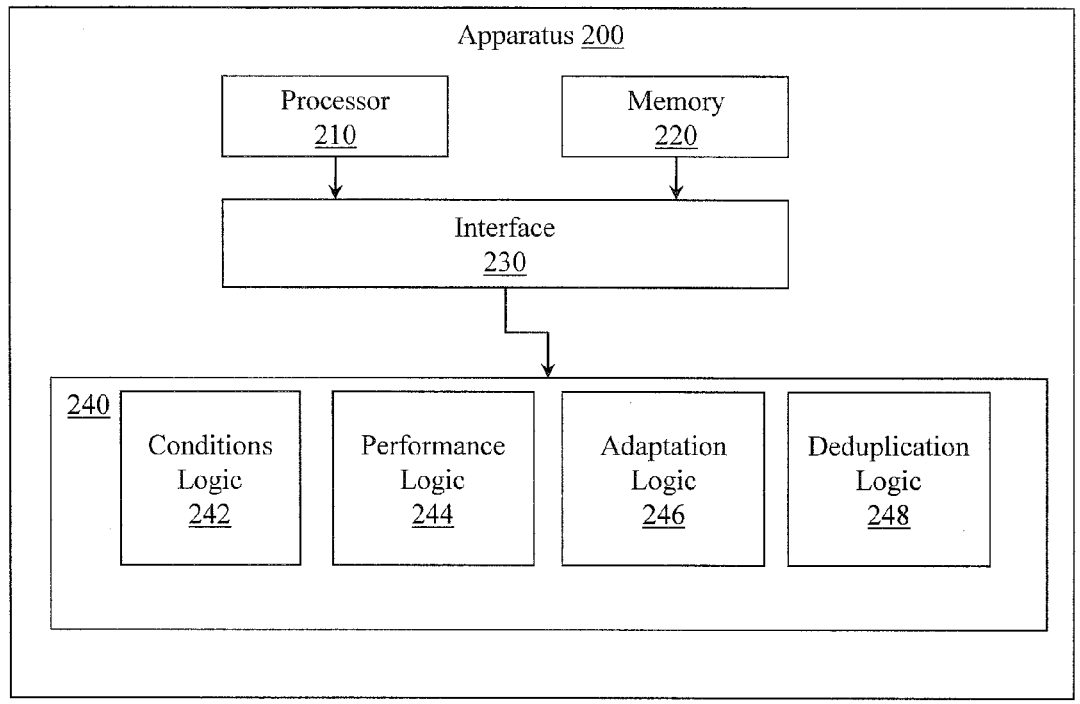
FIG. 3 illustrates an apparatus associated with adaptive collaborative de-duplication.

FIG. 3 illustrates another embodiment of apparatus 200. This embodiment includes an additional logic when compared to the embodiment in FIG. 2. The additional logic is a deduplication logic 248. Deduplication logic 248 is configured to perform the collaborative deduplication processing performed by the client apparatus 200 (e.g., boundary processing, chunking, hashing, sampling, pushing chunks, pulling chunks).

Example systems and methods may perform dedupe processing in different ways for data that is stored in different ways (e.g., archived, stored near-line, stored on-line). Archiving typically focuses on preserving documents or data in a form that has some sort of certifiable integrity. Archives are generally immune to unauthorized access and tampering, and can be the subject of record management operations (e.g., automatic deletion after a certain period, auditor-initiated retrieval). Archives are generally conceived to be an operational system for processing documents and/or data that are no longer in active use. Near-lining concerns holding data that is used less frequently than the most current data but that is used frequently enough that archiving may store the data too deeply. Near-line data is contrasted to online data, which will be the most currently used data. Near-line storage represents a compromise between online storage and offline storage (e.g., archive).

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic. The physical manipulations transform electronic components and/or data representing physical entities from one state to another.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

Figure 4:
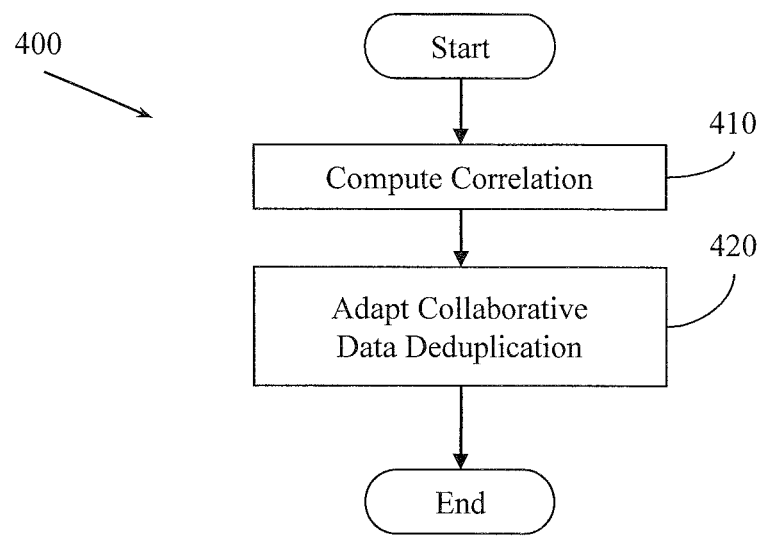
FIG. 4 illustrates a method associated with adaptive collaborative de-duplication.

FIG. 4 illustrates a method 400 associated with adaptive collaborative dedupe. The collaborative dedupe may be, for example, cloud based or client/server based. Method 400 includes, at 410, controlling a computer to compute a correlation between a processing state associated with collaborative data deduplication performed by the computer and an environmental state associated with a collaborative data deduplication environment with which the computer interacts. The correlation may identify whether the computer is configured properly to achieve a desired interaction with the environment. For example, if a busy client computer is doing significant pre-processing when a low cost, high speed link to a more powerful server is available, then the computer may not be achieving an optimal interaction with the collaborative dedupe environment. Similarly, if an idle client computer is pushing 100% of its raw data to a server over a high cost link with lengthy latency and an unacceptable error rate, then once again the computer may not be achieving an optimal interaction.

Method 400 also includes, at 420, controlling the computer to adapt how the computer participates in collaborative data deduplication based, at least in part, on the correlation. Adapting how the computer participates in collaborative data deduplication can include adapting items including what processing is performed on the computer, what data is pushed from the computer, what data is pulled into the computer, what data is stored on the computer, and so on.

Figure 5:
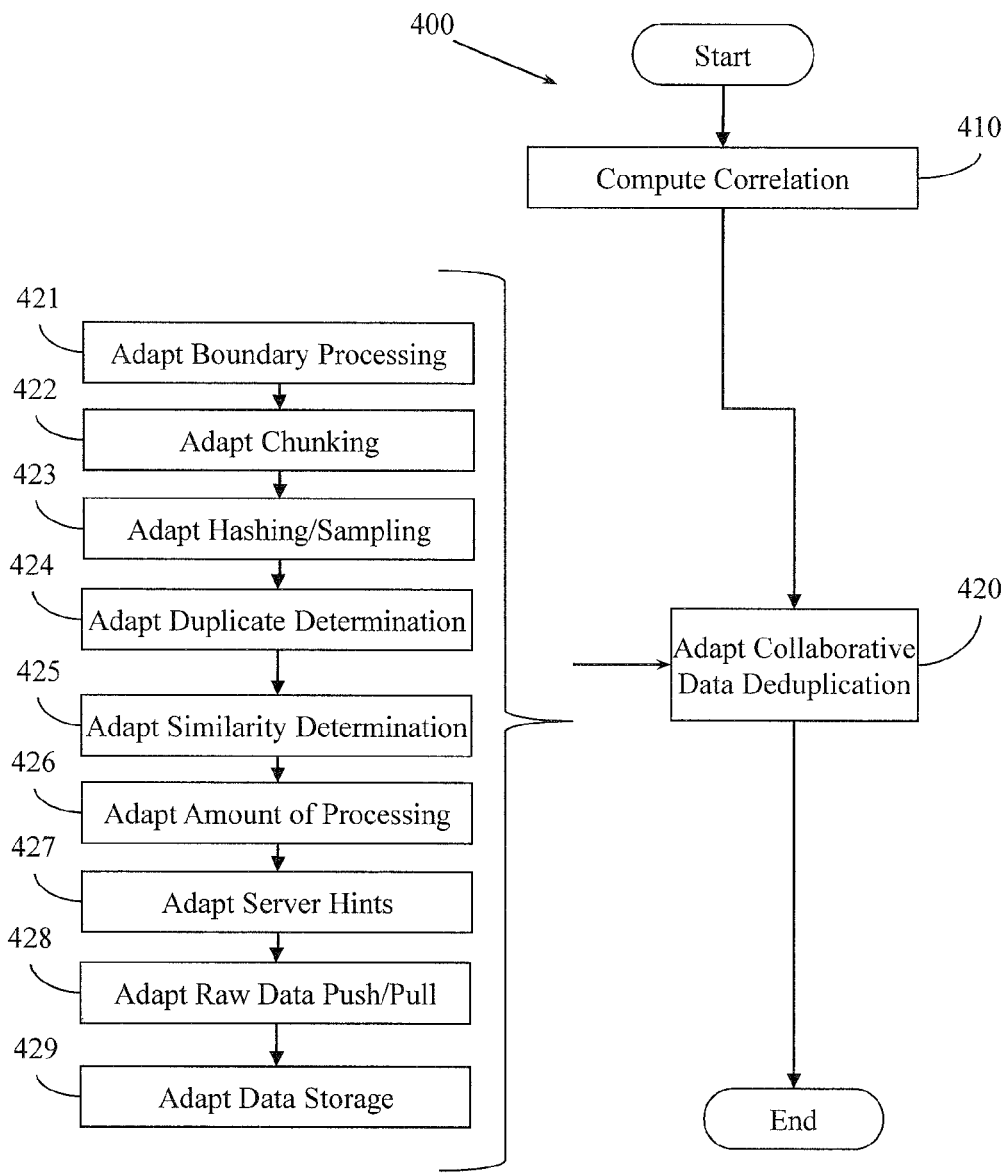
FIG. 5 illustrates a method associated with adaptive collaborative de-duplication.

FIG. 5 provides more detail for action 420. The embodiment of action 420 illustrated in FIG. 5 includes actions 421-429. This embodiment illustrates, at 421, adapting how boundary processing. Adapting boundary processing can include, but is not limited to, adapting how boundary identification is performed (e.g., sliding window, rolling hash), adapting how boundary placement is performed, and adapting where (e.g., on client, on server) boundary placement is performed. Whether boundary processing is adapted may depend, for example, on the amount of processing power available or idle on the client and on what percentage of processing resources at the client the collaborative dedupe is allowed or desired to consume.

This embodiment also illustrates, at 422, adapting chunking. Adapting chunk processing can include, but is not limited to, adapting how chunking is performed (e.g., fixed block, data dependant), and adapting where chunking is performed (e.g., on client, on server). Whether chunk processing is adapted may depend, for example, on the amount of processing power available or idle on the client and on what percentage of processing resources at the client the collaborative dedupe is allowed or desired to consume.

This embodiment also illustrates, at 423, adapting how hashing and/or sampling are performed. Adapting hashing and sampling can include, but is not limited to, adapting how hashing is performed (e.g., cryptographic hash, narrow hash, multiple parallel hashes), adapting where hashing is performed (e.g., on client, on server) adapting how sampling is performed (e.g., single sample, aggregating samples), and adapting where sampling is performed (e.g., on client, on server). Whether hashing and sampling processing is adapted may depend, for example, on the amount of processing power available or idle on the client and on what percentage of processing resources at the client the collaborative dedupe is allowed or desired to consume.

This embodiment also illustrates, at 424, adapting how duplicate determinations are made (e.g., main index lookup, multiple index lookup) and where duplicate determinations are made (e.g., on client, on server). Whether duplicate determination processing is adapted may depend, for example, on the amount of processing power available or idle on the client and on what percentage of processing resources at the client the collaborative dedupe is allowed or desired to consume.

This embodiment also illustrates, at 425, adapting how similarity determinations are made (e.g., single sample, multiple samples, aggregate sample, number of sample points) and where sampling determinations are made (e.g., on client, on server). Whether sampling determination processing is adapted may depend, for example, on the amount of processing power available or idle on the client and on what percentage of processing resources at the client the collaborative dedupe is allowed or desired to consume.

This embodiment also illustrates, at 426, adapting the amount of processing that is performed on the client. Depending on conditions, more or less processing may be performed on the client. For example, given a busy client and an inexpensive channel to the cloud, very little processing may be performed on the client. However, given an idle client and an expensive channel to the cloud, more processing may be performed.

This embodiment also illustrates, at 427, adapting whether server hints are prepared, and, if they are prepared, adapting how they are prepared, where they are stored, when they are provided to a server, what events trigger their creation, storage, and providing, and so on. Whether server hint processing is adapted may depend, for example, on the amount of processing power available or idle on the client and on what percentage of processing resources at the client the collaborative dedupe is allowed or desired to consume.

This embodiment also illustrates, at 428, adapting how much raw data is pushed from the client into the collaborative data deduplication environment, to which server in the collaborative data deduplication environment raw data is pushed, from which server in the collaborative data deduplication environment data is pulled, and other factors associated with raw data processing. How much raw data is pushed or pulled may depend, for example, on the cost, location, and error rate of a channel.

This embodiment also illustrates, at 429, adapting data storage on the client. Adapting data storage can involve adapting items including, but not limited to, how much raw data is stored on the client, how much chunked data is stored on the client, whether a hash for a chunk of data is stored on the client, whether a sample for a chunk of data is stored on the client, how much information concerning a deduplication decision for a chunk of data is stored on the client, how many server hints for a chunk of data are stored on the client, the size of a permuted deduplication data structure on the client, the ordering of a permuted deduplication data structure on the client, the type of data stored on the client, the frequency of how often data stored on the client is accessed, what event triggers accessing data stored on the client, what even triggers manipulating data stored on the client, and the granularity of items for which data is stored. How much data is stored and what types of data are stored may depend, for example, on the amount of memory available at a client and on what percentage of memory resources at the client the collaborative dedupe is allowed or desired to consume.

In one example, a method may be implemented as computer executable instructions. Thus, in one example, a non-transitory computer readable medium may store computer executable instructions that if executed by a computer (e.g., de-duplication client) cause the computer to perform methods described herein.

Figure 6:
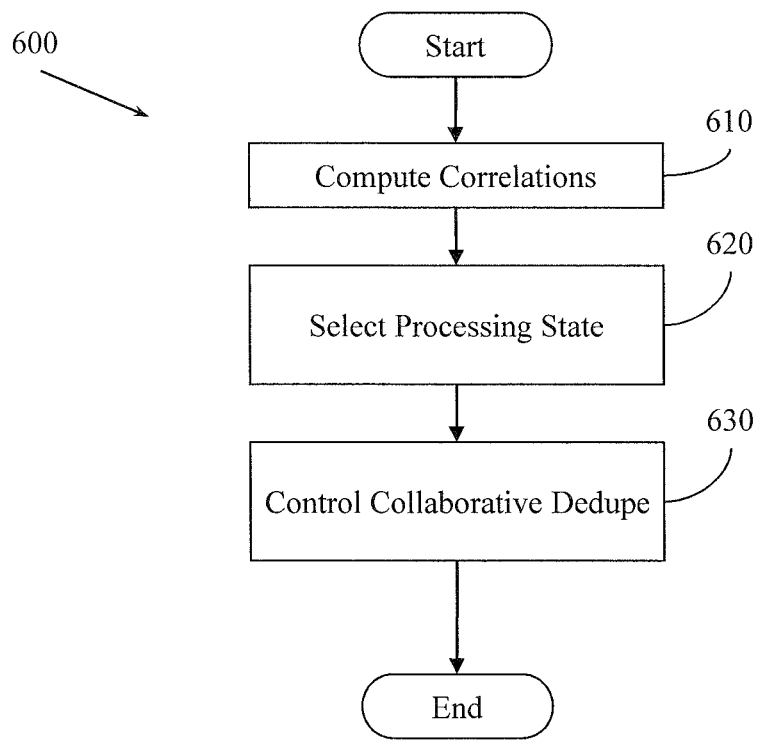
FIG. 6 illustrates a method associated with adaptive collaborative de-duplication.

FIG. 6 illustrates an example method 600. A non-transitory computer-readable medium may store computer-executable instructions that when executed by a client apparatus participating in adaptive, collaborative data de-duplication control the client apparatus to perform method 600. Method 600 includes, at 610, controlling the client to compute a set of correlations between a set of processing states available for collaborative data deduplication to be performed by the client and a set of environmental states associated with a collaborative data deduplication environment with which the client interacts. The correlations can be examined to determine whether a client computer is performing up to a level desired by its owner. For example, the correlations can identify whether the client computer is attempting to minimize cost in a cloud computing environment by pushing as little data as possible and by pushing that data over the least expensive yet acceptable channel possible.

Method 600 also includes, at 620, controlling the computer to select a member of the set of processing states based, at least in part, on the set of correlations. The processing states may identify different combinations of processing and data storage to be performed on the client. For example, a first state may identify that chunking and hashing are to be performed by the client and that server hints are to be computed and stored. A second state may identify that only chunking is to be performed and that no server hints are to be computed. A third state may identify that both hashing and sampling are to be performed on the client and that a one hundred member history buffer of recently hashed and sampled chunks is to be maintained. One skilled in the art will appreciate that there are many possible states into which a client could be placed.

Method 600 also includes, at 630, controlling the computer to engage in collaborative data deduplication according to the member of the set of processing states. This changes the state of a particular computer from one state to another state.

The following includes definitions of selected terms employed herein. The definitions include various examples and/or forms of components that fall within the scope of a term and that may be used for implementation. The examples are not intended to be limiting.

References to "one embodiment", "an embodiment", "one example", "an example", and other similar terms indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" or "in one example" does not necessarily refer to the same embodiment or example.

"Computer readable medium", as used herein, refers to a medium that stores signals, instructions and/or data. A computer readable medium may take forms, including, but not limited to, non-volatile media, and volatile media. Non-volatile media may include, for example, optical disks, and magnetic disks. Volatile media may include, for example, semiconductor memories, and dynamic memory. Common forms of a computer readable medium may include, but are not limited to, a floppy disk, a flexible disk, a hard disk, a magnetic tape, other magnetic medium, an ASIC, a CD (compact disk), other optical medium, a RAM (random access memory), a ROM (read only memory), a memory chip or card, a memory stick, and other media from which a computer, a processor, or other electronic device can read.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

While example apparatus, methods, and articles of manufacture have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A data deduplication client apparatus, comprising:
   a processor;
   a memory; and
   an interface to connect the processor, the memory, and a set of logics, the set of logics comprising:
   a conditions logic configured to control the data deduplication client apparatus to identify a current condition in a collaborative data deduplication environment, where the current condition concerns a current condition in a first deduplication server with which the client apparatus is performing collaborative deduplication, a current condition in a second deduplication server with which the client apparatus is considering performing collaborative deduplication, a current condition in a first communication path between the client apparatus and the first server, a current condition in a second communication path between the client apparatus and the second server, and randomness of data being received at the client apparatus;
   a performance logic configured to control the client apparatus to identify a data deduplication performance criterion for the client apparatus; and
   an adaptation logic configured to selectively reconfigure one or more of, collaborative data deduplication processing performed by the client apparatus, and deduplication related storage performed by the client apparatus, where the selective reconfiguring occurs upon determining that the current condition and the performance criterion do not match a desired deduplication performance profile for the client apparatus.

2. The apparatus of claim 1, where the current condition in the collaborative data deduplication environment concerns
   a current condition in the client apparatus, and
   a current condition in a third communication path between the client apparatus and the first server.

3. The apparatus of claim 2, where the current condition in the client apparatus concerns processing cycles available on the client apparatus, memory available on the client apparatus, disk space available to the client apparatus, randomness of the workload at the client apparatus, and entropy of data to be collaboratively deduplicated by the client apparatus and a collaborating server.

4. The apparatus of claim 2, where the current condition in the first deduplication server concerns a first deduplication approach available on the first server, the randomness of data being ingested at a client computer, the randomness of a workload at the client, and a first deduplication reduction factor achieved by the first server during collaborative deduplication performed with the client apparatus, where the first deduplication reduction factor describes the reduction of stored data, and the reduction of transmitted data.

5. The apparatus of claim 2, where the current condition in the second deduplication server concerns a second deduplication approach available on the second server, and a second deduplication reduction factor achieved by the second server during collaborative deduplication performed with a different client apparatus, and where the second deduplication reduction factor describes the reduction of stored data, and the reduction of transmitted data.

6. The apparatus of claim 2, where the current condition in the first communication path concerns cost per byte to transmit data over the first communication path, cost per packet to transmit data over the first communication path, latency on the first communication path, error rate on the first communication path, and security on the first communication path,
where the current condition in the second communication path concerns cost per byte to transmit data over the second communication path, cost per packet to transmit data over the second communication path, latency on the second communication path, error rate on the second communication path, and security on the second communication path, and
where the current condition in the third communication path concerns cost per byte to transmit data over the third communication path, cost per packet to transmit data over the third communication path, latency on the third communication path, error rate on the third communication path, and security on the third communication path.

7. The apparatus of claim 1, where the data deduplication performance criterion concerns one or more of, cost to deduplicate data, time to deduplicate data, security of deduplicated data, resources consumed at the client apparatus, and a deduplication reduction factor.

8. The apparatus of claim 1, where the desired deduplication performance profile is a function of cost compared to deduplication reduction achieved, time compared to deduplication reduction achieved, and resources compared to deduplication reduction achieved.

9. The apparatus of claim 8, where there are separate data deduplication performance criteria for different workloads associated with archive based deduplication, with nearline based deduplication, and with online based deduplication.

10. The apparatus of claim 1, where the collaborative data deduplication processing performed by the client apparatus includes sampling, making a duplicate determination, making a similarity determination, and preparing server hints.

11. The apparatus of claim 10, where reconfiguring the client apparatus by adapting the collaborative deduplication processing performed by the client apparatus comprises changing what processing is performed on the client apparatus, to which server raw data is pushed, from which server data is pulled, the granularity of server hints, and what server hints are provided to a server.

12. The apparatus of claim 1, where deduplication related storage performed by the client apparatus comprises storing, in one or more permuted data structures on the client apparatus, a sample for a chunk of data, information concerning a deduplication decision for a chunk of data, and a server hint for a chunk of data, where the server hint facilitates a server performing deduplication processing for the chunk of data.

13. The apparatus of claim 12, where reconfiguring the client apparatus by adapting deduplication related storage performed by the client apparatus comprises changing one or more of, the size of a permuted data structure on the client apparatus, the ordering of a permuted data structure on the client apparatus, the type of data stored on the client apparatus, how frequently data stored on the client apparatus is accessed, what event triggers accessing data stored on the client apparatus, what event triggers manipulating data stored on the client apparatus, and the granularity of items for which data is stored.

14. The apparatus of claim 1, comprising:
a deduplication logic configured to perform the collaborative deduplication processing performed by the client apparatus.

15. A computer-implemented method, comprising:
controlling a computer to compute a correlation between a processing state associated with collaborative data deduplication performed by the computer and an environmental state associated with a collaborative data deduplication environment with which the computer interacts; and
controlling the computer to adapt how the computer participates in collaborative data deduplication based, at least in part, on the correlation, where adapting how the computer participates in collaborative data deduplication comprises adapting how boundary identification is performed, how boundary placement is performed, how chunking is performed, how hashing is performed, how sampling is performed, how a duplicate determination is made, how a similarity determination is made, how server hints are prepared, what deduplication processing is performed on the client, to which server in the collaborative data deduplication environment raw data is pushed, from which server in the collaborative data deduplication environment data is pulled, and what server hints are provided to a server in the collaborative data deduplication environment.

16. The computer-implemented method of claim 15, where adapting how the computer participates in collaborative data deduplication comprises adapting how much raw data is stored on the computer, how much chunked data is stored on the computer, whether a hash for a chunk of data is stored on the computer, whether a sample for a chunk of data is stored on the computer, how much information concerning a deduplication decision for a chunk of data is stored on the computer, how many server hints for a chunk of data are stored on the computer, the size of a permuted deduplication data structure on the client, the ordering of a permuted deduplication data structure on the client, the type of data stored on the client, the frequency of how often data stored on the client is accessed, what event triggers accessing data stored on the client, what even triggers manipulating data stored on the client, and the granularity of items for which data is stored.

17. The computer-implemented method of claim 16, where the collaborative data deduplication is one or more of, cloud based, and client/server based.

* * * * *

UNITED STATES PATENT AND TRADEMARK OFFICE
CERTIFICATE OF CORRECTION

| | | |
|---|---|---|
| PATENT NO. | : 8,849,898 B2 | Page 1 of 1 |
| APPLICATION NO. | : 12/963951 | |
| DATED | : September 30, 2014 | |
| INVENTOR(S) | : Tofano | |

It is certified that error appears in the above-identified patent and that said Letters Patent is hereby corrected as shown below:

In the Specification:

In the Detailed Description:

In Column 3, line 27, delete "to what server(s)" and insert --to which server(s)--.

In Column 5, line 17, delete "client 1 110" and insert --client1 110--.

In Column 5, line 19, delete "Client 1 110 may chunk and hash that data. Client 1 110 may" and insert --Client1 110 may chunk and hash that data. Client1 110 may--.

In Column 5, lines 24-25, delete "Client 1 110" and insert --Client1 110--.

In Column 5, line 27, delete "maximum" and insert --maximizing--.

In Column 5, line 35, delete "client 1 110" and insert --client1 110--.

In Column 5, line 37, delete "client 1 110" and insert --client1 110--.

In Column 6, line 4, delete "the first server" and insert --the third server--.

In Column 7, line 65, delete "what even triggers" and insert --what event triggers--.

In Column 9, lines 14-15, delete "adapting how boundary" and insert --adapting boundary--.

In Column 10, line 36, delete "what even triggers" and insert --what event triggers--.

In the Claims:

In column 14, line 53, delete "what even triggers" and insert --what event triggers--.

Signed and Sealed this
Sixteenth Day of December, 2014

Michelle K. Lee
*Deputy Director of the United States Patent and Trademark Office*